United States Patent [19]

Chiu et al.

[11] Patent Number: 4,509,414

[45] Date of Patent: Apr. 9, 1985

[54] STEMMING AND PEELING APPARATUS

[75] Inventors: Tony T. Chiu; Charles W. Coatney, both of Los Gatos; Katsuji Hirahara, Santa Clara, all of Calif.

[73] Assignee: Magnuson Corporation, Reno, Nev.

[21] Appl. No.: 526,606

[22] Filed: Aug. 26, 1983

[51] Int. Cl.³ .......................... A23N 7/00; A23N 7/02
[52] U.S. Cl. ...................................... 99/585; 99/623; 99/640
[58] Field of Search .......................... 99/584, 585–587, 99/623–625, 626, 628, 629, 637, 640; 15/3.17, 3.19, 3.2, 3.21; 426/481–483

[56] References Cited

U.S. PATENT DOCUMENTS

| | | | |
|---|---|---|---|
| 2,601,055 | 6/1952 | Rahal | 99/640 |
| 2,707,982 | 5/1955 | Magnuson | 99/640 |
| 2,776,690 | 1/1957 | Warren | 99/585 |
| 2,835,295 | 5/1958 | Magnuson | |
| 4,152,977 | 5/1979 | Lazzarini | 99/640 |
| 4,242,952 | 1/1981 | van der Schoot | 99/626 X |
| 4,444,096 | 4/1984 | Silvestrini et al. | 99/623 X |

Primary Examiner—Timothy F. Simone
Attorney, Agent, or Firm—Gerald L. Moore

[57] ABSTRACT

An apparatus for removing appendages (10A) from articles or produce (10) comprising a first conveyor (12) carrying a plurality of pairs of counter-rotating rolls (16) and (17) for movement along an inclined section (14). The articles are introduced through a chute (15) to roll down the inclined section with the appendages being caught and pulled therefrom by the counter-rotating rolls. A second conveyor (60) carries plows (71) to contact and regulate the dwell time of the articles on the pinch rolls. The dwell time can be regulated by changing the speed of the first and second conveyors and the inclination of the first conveyor. A waste tray (48) catches the removed appendages and blades (49) carried on the bottom side of the first conveyor move the waste debris from the waste tray.

8 Claims, 4 Drawing Figures

STEMMING AND PEELING APPARATUS

FIELD OF THE INVENTION

This invention relates to apparatus for pulling stems from fruit and vegetables of removing skin from similar products.

BACKGROUND OF THE INVENTION

Pinch roll stemmers have been used extensively, especially for removing stems from olives and the like. For instance in U.S. Pat. No. 2,707,982, Olive Stemming Apparatus, issued on May 10, 1955 such a stemmer is disclosed. Usually such apparatus are made for one specific purpose, i.e. removing stems from olives or other fruit or removing pieces of skin, sometimes called "tags" from tomatoes which have been steamed or otherwise treated to make the skin come loose. Because such stemmers have been designed for a single purpose they are not universally usable for many different tasks.

It is the purpose of the present invention to provide such a stemmer and tag remover that is adjustable in many respects to permit universal use.

SUMMARY OF THE INVENTION

Apparatus for removing tags and stems from articles such as fruits and vegetables, comprising a frame, a first conveyor supporting a plurality of pinch rolls with a top section of such conveyor being positioned to move upward at an angle to the horizontal, means to introduce the articles onto said top section and means to rotate such roll of a pair of adjacent rolls in opposite directions to grasp and remove stems and tags from the articles as they proceed down the inclined section. A second conveyor supports a plurality of plows in position above the inclined section of the first conveyor for movement of the adjacent portion and supported plows thereof in the opposite or downhill direction so as to contact and regulate the downward motion of the product on the inclined section. The plows may include sections not extending normal to the direction of movement to impart a slight sidewise pressure and roll on the product for exposure of all exterior surfaces thereof to the pinch rolls. A tray positioned beneath the inclined section catches the stems, etc. and plows fixed to the bottom side of the first conveyor push the waste along the tray to an off-bearing conveyor. The speed of operation of the first and second conveyors and the tilt of the inclined section can be adjusted to regulate the rate at which the products proceed down the first conveyor inclined section thereby regulating the time of exposure to the pinch rolls to allow for the proper processing of different fruit and vegetables.

DESCRIPTION OF THE INVENTION

Figure 1:
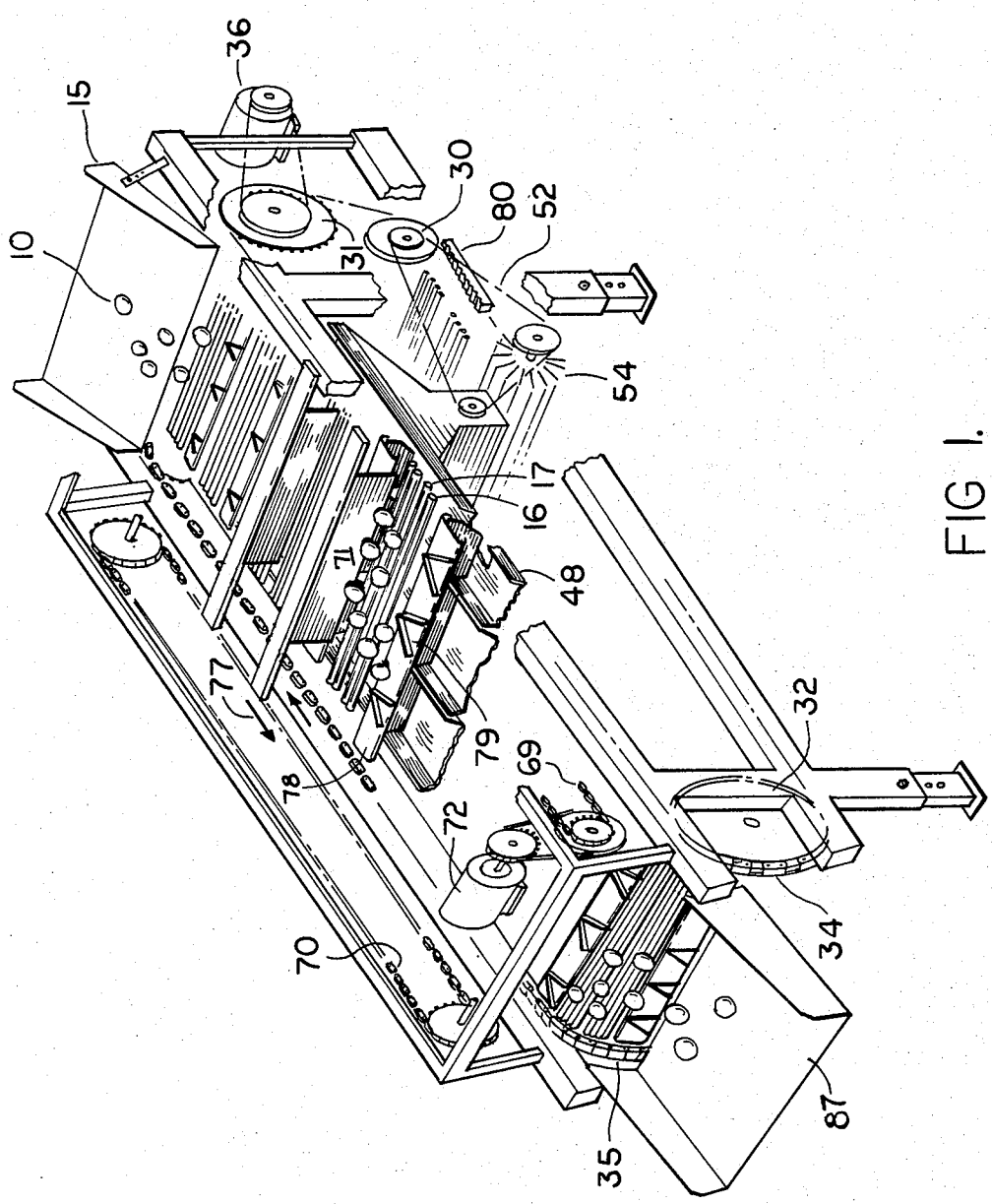
FIG. 1 is a view of the end of the apparatus incorporating the subject invention.
Figure 2:
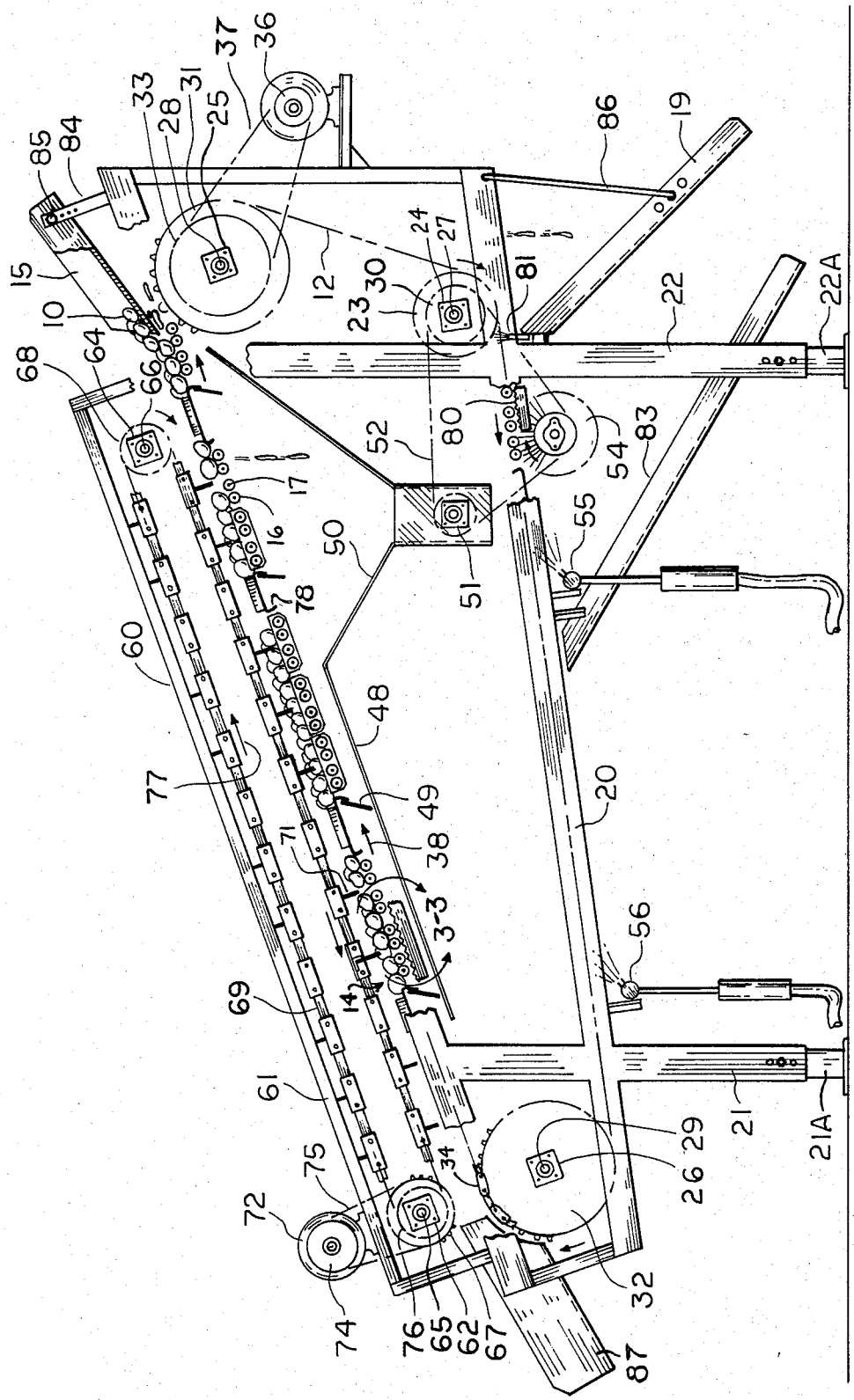
FIG. 2 is a side view of the apparatus.
Figure 3:
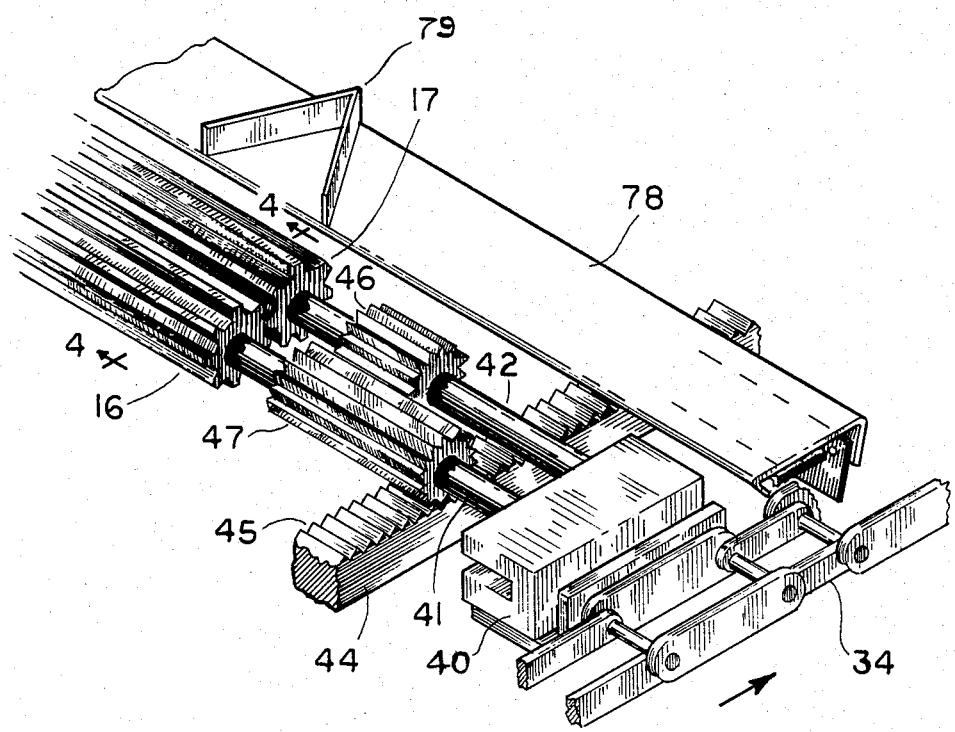
FIG. 3 is a perspective view of the section 3—3 of FIG. 2.
Figure 4:
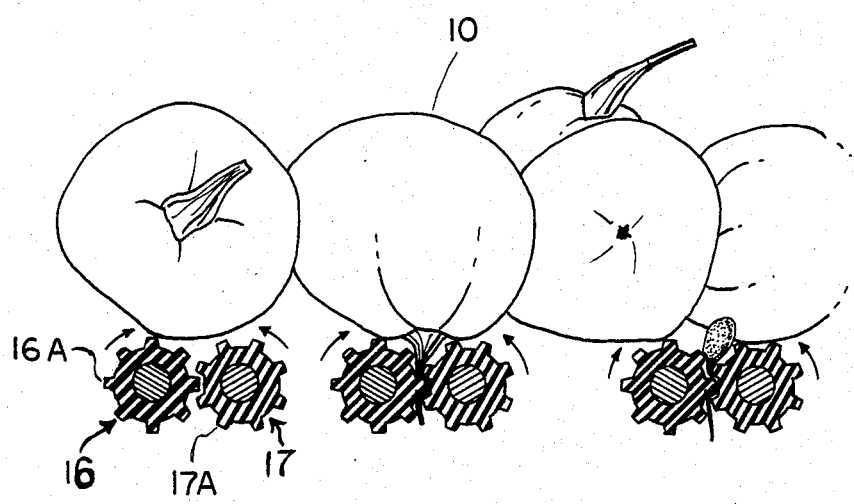
FIG. 4 is an enlarged cross sectional view of a plurality of pinch rolls showing the article thereon.

In FIGS. 1 and 2 is shown an apparatus for removing stems or tags from fruits or vegetables 10. Usually such fruits and vegetables are substantially round, at least through one cross sectional area, and there is need to remove stems from such articles as olives, cherries and the like. With tomatoes peeling is accomplished by first steam heating or otherwise treating the tomato to loosen the skin and skin removal can result in the formation of pieces of skin, called tags, still adhering to the pulp body which must be removed. By passing the tomato or vegetables 10 over the pinch rolls the stems and tags 10A are pulled from he pulp body by the rolls. Such roll action is well known and described in the patent referenced previously.

To accomplish the pinch roll action in an improved manner there is provided in the subject invention a first conveyor 12 including an upwardly proceeding inclined section 14. The product is fed through a chute 15 to fall on the first conveyor at the top of the inclined portion and proceed to ride down this section with a rolling action imparted by the rotating pairs of rolls 16 and 17. As these pairs of rolls having the projections 16A and 17A, respectively, are counter-rotated in a manner to be described later, the tags or stems are pulled away by contact between the high portions of the rolls. By utilizing the inclined counter-rotating roll conveyor, half sections and pieces of the products are separated from the whole articles because the half sections will not roll down the inclined section but instead will ride the conveyor upward to fall off the upper end into a collection basin 19.

For supporting the first conveyor a frame 20 is supported on pairs of adjustable legs 21 and 22. Mounted on the frame are pairs of journal-bearing housings 24, 25 and 26 supporting respectively the shafts 27, 28 and 29. Fixed to these shafts respectively are pairs of spaced sprockets 30, 31 and 32 for supporting the first conveyor. The first conveyor comprises a pair of spaced conveyor chains 34 and 35 with each chain being supported around one of the pair of sprockets 30, 31 and 32. For driving the first conveyor a variable speed motor 36 is mounted on the frame for powering a drive chain 37 driving a sprocket 33 connected to the shaft 28. Thus the first conveyor is driven in the direction of the arrow 38 for moving the inclined section uphill counter to the direction of the normal flow of the articles 10.

At spaced positions along the conveyor chains 34 and 35 are positioned the roll mounts 40 in which are journaled the shafts 41 and 42 supporting the adjacent rolls 16 and 17. Fixed to the frame along the inclined section is a rack 44 having a geared top surface 45. Meshing with this geared surface is a gear 47 fixed to the shaft 41. A second gear 46 meshes with the first gear 47. Thus as the chain is driven to move the roll support 40 up the inclined section the gear 47 meshes with the geared surface 45 of the rack to turn the roll 16 in the clockwise direction and in turn rotate the roll 17 in the counterclockwise direction to function in the manner previously described. Thus the rolls of a pair of rolls are turned in counter-rotating directions.

Positioned beneath the inclined section of the first conveyor is a waste tray 48 to catch the tags, stems, etc., pulled from the produce carried on the conveyor inclined section. A plurality of blades 49 fixed to the bottom of the first conveyor are moved along this waste tray to push the waste upward over the tray top edge to fall down into the catch basin 50 and to be carried away by a screw 51 driven by a chain 52 powered by a sprocket (not shown) fixed to the shaft 27 of the first conveyor. For cleaning the first conveyor a brush 54 is also driven by the chain 52 to contact and clean any waste material therefrom. Water sprays 55 and 56 also clean the first conveyor by spraying water thereon.

The efficiency of removing stems, tags, etc. from the produce depends to a large extent on the dwell time the article spends on the first conveyor. A first control of this time is achieved by adjusting the speed of the driver motor 36 to regulate the linear speed of the first conveyor. There is a limit however to the amount of speed adjustment that can be made because if the conveyor is caused to run too fast a portion of the articles will be carried up over the top and if the conveyor is caused to run too slow the articles will merely roll down the conveyor and be exposed very little to the pinch rolls.

A second adjustment for regulating the article dwell time is provided in the adjustment of the tilt of the inclined section. This tilt can be changed by lengthening or shortening the legs 21 and 22. The legs comprise telescoping sections 21A and 22A, respectively, which are bolted together to allow adjustability of the length.

Yet another manner of regulating the dwell time of the articles and also assuring better exposure of the article to the pinch rolls is provided by use of a second conveyor 60 mounted above the inclined section of the first conveyor. This second conveyor is supported on a frame 61 supporting pairs of journal bearing assemblies 62 and 64. Shafts 65 and 66 are mounted in the respective journal assemblies to which are fixed the pairs of spaced sprockets 76 and 68. Parallel endless chains 69 and 70 are mounted about the sprockets. Semi-rigid plows 71 are fixed between these chains at spaced positions therealong.

An adjustable speed drive motor 72 drives a sprocket 74 which in turn drives a chain 75 extending around a second sprocket 67 fixed to the shaft 65. Thus by energizing the drive motor 72 the second conveyor is rotated in the direction of the arrow 77 so as to move the plows in a direction down the inclined section of the first conveyor at a predetermined and controlled speed. As shown in FIG. 2 the articles tend to group between the plows and are thus regulated in the speed of descent along this inclined section thereby closely controlling the dwell time of the articles and the density of the product on the pinch rolls. This action provides for a close control of the exposure of the articles, thereby providing for a better tag and stem removal from the produce. Such control is also provided regardless of the direction of movement of the first and second conveyors, however the embodiment described provides the advantage of separating half articles and pieces from the whole articles.

Additionally the plows 71 can be formed with a V-configuration so as to impart a side force on the articles and cause a roll thereof in the direction across the first conveyor surface as well as down the conveyor. In doing so the articles are thus prevented from rolling in one plane as they pass along the conveyor surface thereby exposing all surfaces thereof to the pinch rolls. Those product with flat sides etc. that ride up the incline of the conveyor will deflect the plow and pass thereunder. The deflection of the plow actually tends to mix the other product and roll it sidewise for better stem removal.

Thus there is provided a conveyor in which the dwell time on the pinch rolls can be regulated in one of several ways. The speed of the first conveyor can be regulated, the tilt of the first conveyor can be regulated and the speed of the second conveyor can be changed, all independently, to assure that the articles on the first conveyor are sufficiently exposed to the action of the pinch rolls.

In accordance with another feature of the invention there is interleaved between selected rolls a tumbling bar 78 supported between the conveyor chains 34 and 35. The purpose of these tumbler bars which are spaced approximately every ten rolls is to impart a sidewise and lengtwise rotation on the product. Frequently the product can rest in the rolls and only rotate about an axis parallel to the rolls. The bars 78 each carry a plurality of bumpers 79 thereon comprising members that contact and roll the product both sidewise and lengthwise to expose other sides of the product to the rolls. Thus all the product sides are equally exposed to the rolls 16 and 17. These bars 78 also serve to tie together the conveyor chains to make the structure more rigid.

According to another feature of the invention, the rolls 16 and 17 are cause to roll in the opposite direction momentarily to expel any matter or waste that might be lodged and held therebetween. For this purpose there is positioned a rack 80 to contact the pinion gears 47 on the outside edge and rotate the rolls in the direction opposite to the rotation caused by the rack 44. Thus any foreign matter trapped between the rolls is better expelled by the opposite direction rotation. A brush 81 positioned adjacent the rack 80 also assists in dislodging product from the rolls.

To regulate the size of the product that is allowed to ride up the inclined section of the conveyor, the clearance of the chute 15 above the conveyor is made adjustable. For this purpose the chute is supported on uprights 84 by bolts 85 passing through the chute sides. By loosening these bolts and pivoting the chute therearound, the clearance between the bottom lip and the conveyor can be adjusted. Since this chute bottom lip intercepts all half product, etc. that rides up the conveyor in the manner previously described, this clearance distance determines the size of the parts allowed to ride over the top edge of the conveyor. Adjustment of this distance allows adjustment of the reject size. Those parts not clearing the chute will be forced to ride down the inclined section by oncoming product. Chutes 83 and 19 catch waste product and flat-sided product respectively while chute 87 receives the processed product leaving the bottom end of the inclined surface. The rod 86 supports the chute 19.

We claim:

1. An apparatus for stemming and peeling produce, comprising:

a first conveyor having an inclined section and carrying a plurality of parallel-positioned pinch rolls extending normal to the direction of travel of the conveyor;

means to drive said first conveyor;

first rotating means rotating adjacent pinch rolls on said first conveyor in opposite directions;

a chute for feeding the produce onto the first conveyor at one end of said inclined section to allow the produce to ride on the first conveyor throughout that section and be exposed to the pulling action of said opposite rotating pinch rolls;

means to control the rate at which the produce moves across the inclined section thereby to regulate the dwell time the produce spends on the pinch rolls and the density of the product to assure removal of a predetermined percentage of appendages from the produce; and said means to control the rate the produce moves across the inclined section comprising a second conveyor carrying plows positioned to move along the inclined section in a direction opposite to the direction the first conveyor is moving to control the rate the produce moves across the inclined section.

2. An apparatus as defined in claim 1 wherein said means to control the rate includes means to vary the speed of movement of said first conveyor.

3. An apparatus as defined in claim 1 wherein said means to control the rate includes means to vary the speed of movement of said second conveyor.

4. An apparatus as defined in claim 1 wherein said means to control the rate includes means to vary the inclination of said first conveyor inclined section.

5. An apparatus as defined in claim 1 wherein at least some of said second conveyor plows are V-configured to impart a sidewise motion on said produce on said inclined section.

6. An apparatus as defined in claim 1 including a waste tray positioned below the first conveyor inclined section to catch the appendage debris separated from the produce and a plurality of blades fixed to the underside of said first conveyor to move the debris of said waste tray.

7. Apparatus as defined in claim 1 wherein said plows are semi-rigid to allow flat sided produce to pass thereunder and ride with said first conveyor.

8. Apparatus as defined in claim 1 wherein said chute is positioned near the top of said inclined section with adjustable means to support said chute to allow adjustment of the distance between said first conveyor and chute to control the size of produce that passes between the chute and conveyor.

* * * * *